(12) United States Patent
Geva et al.

(10) Patent No.: US 6,542,686 B1
(45) Date of Patent: Apr. 1, 2003

(54) OPTOELECTRONIC DEVICE INCLUDING A BARRIER LAYER AND INTERFACE BARRIER LAYER AND A METHOD OF MANUFACTURE THEREOF

(75) Inventors: Michael Geva, Allentown, PA (US); Claude Lewis Reynolds, Jr., Sinking Spring, PA (US); Lawrence E. Smith, Macungie, PA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/648,159

(22) Filed: Aug. 25, 2000

(51) Int. Cl.[7] .................................................. G02B 6/10
(52) U.S. Cl. ........................... 385/131; 385/31; 257/14; 438/606
(58) Field of Search .................... 385/129, 130, 385/131, 132, 14, 15, 16, 31; 257/9, 12, 14, 24; 438/164, 311, 459, 584, 604, 606, 607, 681; 359/114, 115, 117

(56) References Cited

U.S. PATENT DOCUMENTS 5,432,356 A * 7/1995 Imamura ...................... 257/24
6,004,865 A * 12/1999 Horiuchi et al. ............. 438/459

* cited by examiner

*Primary Examiner*—Cassandra Spyrou
*Assistant Examiner*—Euncha Cherry
(74) *Attorney, Agent, or Firm*—Hitt Gaines & Boisbrun P.C.

(57) ABSTRACT

The present invention provides an optoelectronic device and a method of manufacture therefor, that prevents dopant diffusion and controls the dopant concentration therein. The optoelectronic device includes an active region formed over a substrate, and an interface barrier layer and barrier layer located over the active region. The optoelectronic device further includes an upper cladding layer located over the interface barrier layer and the barrier layer. In an exemplary embodiment of the invention, the interface barrier layer is an indium phosphide interface barrier layer and the barrier layer is an indium gallium arsenide phosphide barrier layer.

35 Claims, 5 Drawing Sheets

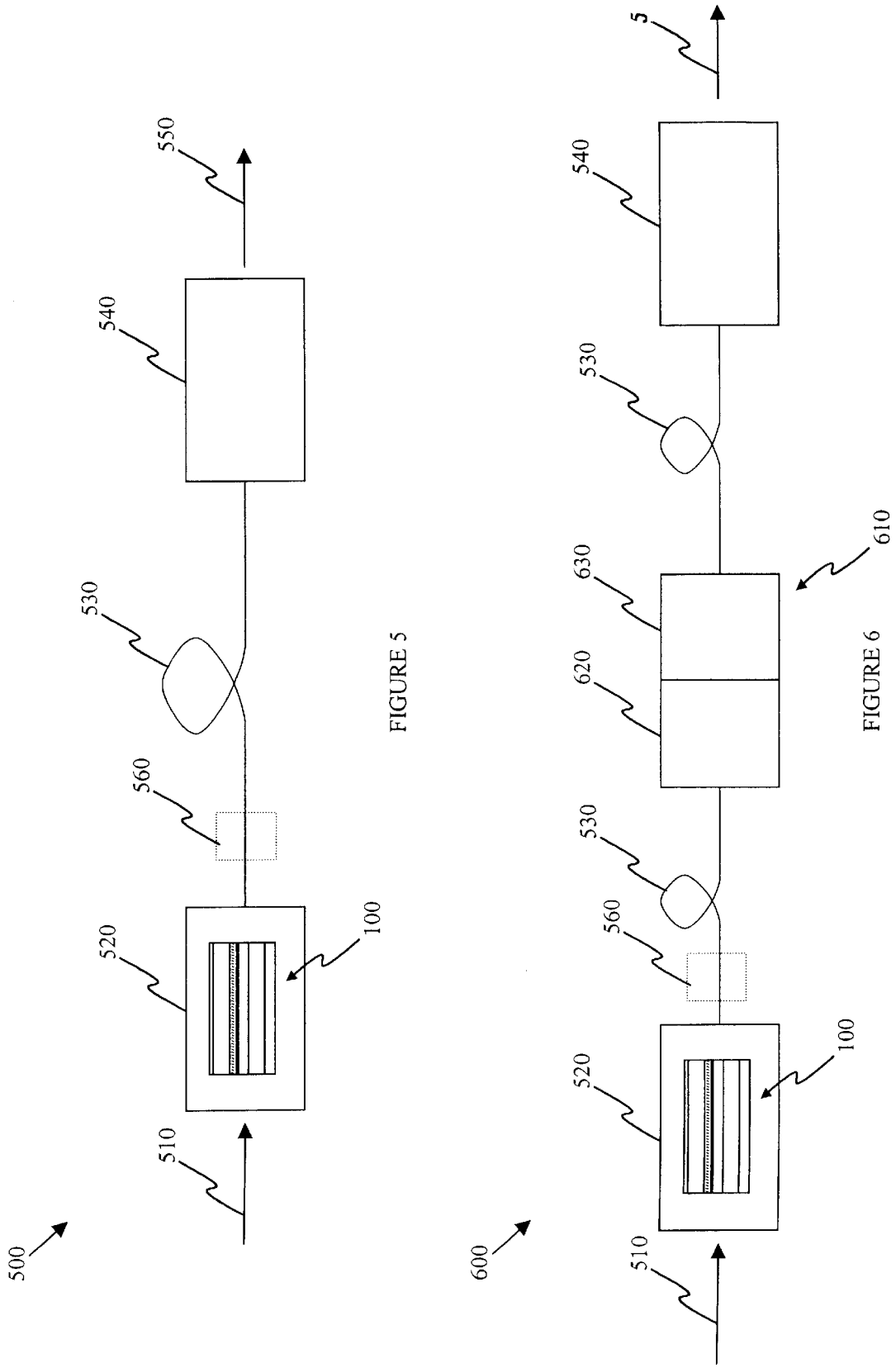

OPTOELECTRONIC DEVICE INCLUDING A BARRIER LAYER AND INTERFACE BARRIER LAYER AND A METHOD OF MANUFACTURE THEREOF

TECHNICAL FIELD OF THE INVENTION

The present invention is directed, in general, to an optoelectronic device and, more specifically, to an optoelectronic device having a barrier layer and an interface barrier layer located therein, and a method of manufacture thereof.

BACKGROUND OF THE INVENTION

Optical fibers are key components in modern telecommunications and have gained wide acceptance. As is well known, telecommunication optical fibers are thin strands of glass capable of transmitting an optical signal containing a large amount of information over long distances with very low loss. Single fibers can carry multiple packets of data that are multiplexed on the fiber either by time division, where different slots of time are allocated to different packets, or by wave division multiplexing, where different wavelengths are allocated for different data. Optoelectronic devices, such as modulators and switches, perform the important function of adding information content to optical signals in optical communications systems. Such devices may include epitaxially grown multi quantum well type structures of an indium phosphide or indium gallium arsenic phosphide (InGaAsP) base. The quantum well type structures may be undoped, or may be doped with various n-type and p-type dopants.

The precision placement of the p-n junction in the active regions of optoelectronic devices is critically important for meeting the increasingly stringent requirements on device performance, such as modulation bandwidth, output power, extinction ratio, and uncooled operation. Zinc is presently the most commonly used p-type dopant in cladding and contact layers of various optoelectronic devices. These zinc layers are typically, but not necessarily, grown last, after active regions and blocking structures of the optoelectronic device have already been formed. Due to the high temperatures used to epitaxially grow layers by metalorganic vapor phase epitaxy (MOVPE), large amounts of zinc currently diffuse into the active region of the device. This zinc diffusion is highly undesirable because it can cause a shift of emitting wavelengths (up to tenths of microns) and reshaping of the zinc distribution profile. Moreover, the excess zinc in the active region may result in degradation of device characteristics, such as extinction ratio and junction capacitance in electroabsorbtion modulator structures.

One way the optoelectronic device manufacturing industry has attempted to substantially reduce the zinc diffusion into the active region, is to epitaxially form an undoped zinc set-back above the active region, prior to forming the zinc doped upper layer. The undoped zinc set-back, if manufactured correctly, is capable of substantially reducing the zinc diffusion into the active area. However, a problem with the zinc set-back layer, is that its optimal thickness is sensitive to the structure parameters (such as doping level and thickness) and growth conditions (growth rate and temperature) of the zinc-doped and contact layers. Thus, the zinc set-back layer needs to be customized for each device structure and reactor, which is time consuming and costly. Furthermore, the zinc set-back layer does not provide an adequate control, i.e., not reproducible, over the shape of the final zinc distribution in the upper layer.

Another way the optoelectronic device manufacturing industry has attempted to substantially reduce the zinc diffusion problems, is to incorporate a highly silicon doped layer between the zinc doped upper layer and the active region. This method tends to prevent the zinc from diffusing into the active region; however, the effectiveness of the silicon doping layer is very sensitive to the silicon doping level and the layer thickness. In addition, silicon is an n-type dopant, and when included between the upper layer and the active device, may form an additional, unwanted, p-n junction above the active region. This is generally undesirable as well, because it may degrade the device's optical characteristics.

Accordingly, what is needed in the art is an optoelectronic device that does not encounter the problems associated with the prior art optoelectronic devices, and more specifically, an optoelectronic device, and a method of manufacture therefor, that prevents the diffusion of dopants into the active device regions.

SUMMARY OF THE INVENTION

To address the above-discussed deficiencies of the prior art, the present invention provides an optoelectronic device with superior quality. The optoelectronic device includes an active region located over a substrate, and an interface barrier layer and barrier layer located over the active region. The optoelectronic device further includes an upper cladding layer located over the interface barrier layer and the barrier layer. In an exemplary embodiment of the invention, the interface barrier layer is an indium phosphide interface barrier layer and the barrier layer is an indium gallium arsenide phosphide barrier layer.

Thus, one aspect of the present invention provides an optoelectronic device that does not experience substantial dopant diffusion into the active region, as experienced in the prior art optoelectronic devices. Moreover, the present optoelectronic device does not experience the higher threshold current, lower slope efficiency, and leakage of current out of the active region, as experienced in the prior art optoelectronic devices.

An alternative aspect of the invention provides a method of manufacturing the previously mentioned optoelectronic device. The method includes (1) forming an active region over a substrate, (2) forming an interface barrier layer over the active region, (3) forming a barrier layer over the active region, and (4) forming an upper cladding layer over the interface barrier layer and the barrier layer. Also included in the present invention, is an optical fiber communications system. The optical fiber communication system, in an advantageous embodiment, includes an optical fiber, a transmitter and a receiver connected by the optical fiber, and the optoelectronic device illustrated above.

BRIEF DESCRIPTION OF THE DRAWINGS

The invention is best understood from the following detailed description when read with the accompanying FIGUREs. It is emphasized that in accordance with the standard practice in the optoelectronic industry, various features may not be drawn to scale. In fact, the dimensions of the various features may be arbitrarily increased or reduced for clarity of discussion. Reference is now made to the following descriptions taken in conjunction with the accompanying drawings, in which:

FIG. 5 illustrates an optical fiber communication system, which forms one environment where the completed optoelectronic device may be used; and FIG. 6 illustrates an alternative embodiment optical fiber communication system, including a repeater.

DETAILED DESCRIPTION

Figure 1:
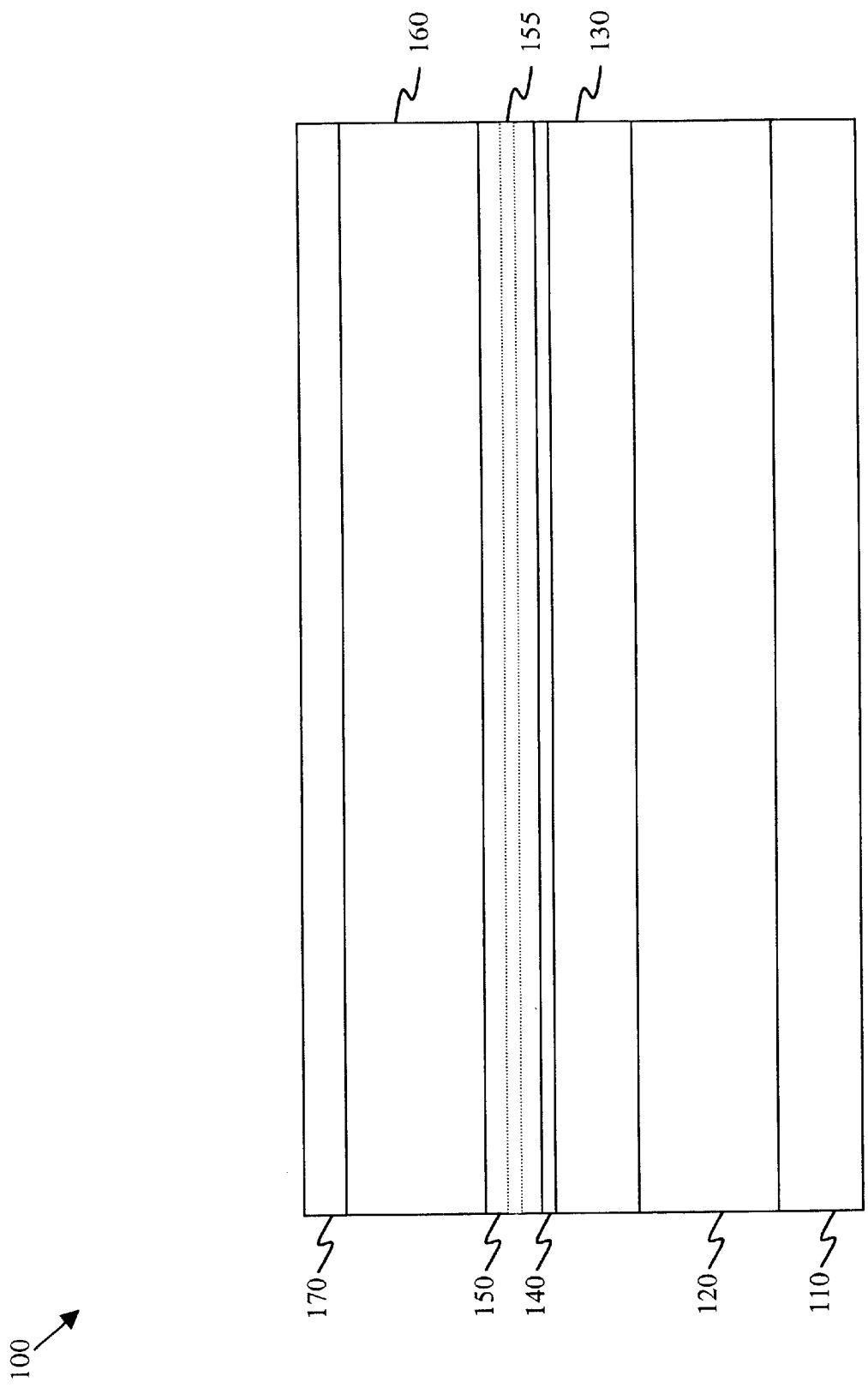
FIG. 1 illustrates one embodiment of a completed optoelectronic device, taught herein.

Referring initially to FIG. 1, a cross-sectional view of one exemplary embodiment of the present invention used in an illustrative optoelectronic device 100, is shown. The present invention is broadly directed to an optoelectronic device made of any material or compound that may have use in such devices. In the illustrative embodiments described herein, the optoelectronic device 100 is specifically discussed as a group III–V based device, for example an indium phosphide/indium gallium arsenide phosphide based device, a gallium arsenide based device, an aluminum gallium arsenide based device, or another group III–V based device. However, even though the present invention is discussed in the context of a group III–V based device, it should be understood that the present invention is not limited to group III–V compounds and that other compounds located outside groups III–V.

The illustrative embodiment of the optoelectronic device 100 includes a substrate 110, a lower cladding layer 120 and a conventional active region 130. The optoelectronic device further includes an interface barrier layer 140 and a barrier layer 150, both located between the active region 130 and a doped upper cladding layer 160. A contact layer 170 is located over the doped upper cladding layer 160. In an illustrative embodiment, the barrier layer 150 includes a doped section 155. The doped section 155, in an exemplary embodiment is an n-doped section.

The interface barrier layer 140 and the barrier layer 150 substantially reduce the amount of diffusion of the dopant located within the upper cladding layer 160, into the active region 130. As a result of the substantially reduced diffusion of the upper cladding layer dopant into the active region 130, the optoelectronic device does not experience degradation of its device characteristics, as experienced by the prior art optoelectronic devices, discussed above. Moreover, this is accomplished while maintaining precise control over the p-n junction placement and background doping in the active region 130, which is in contrast to the prior art structures. The use of the interface barrier layer 140 and the barrier layer 150 also allow for optimal design of the upper cladding layer 160 and contact layer 170, without being concerned with the zinc diffusion, and the detrimental effects the zinc diffusion has on device performance.

Figure 2:
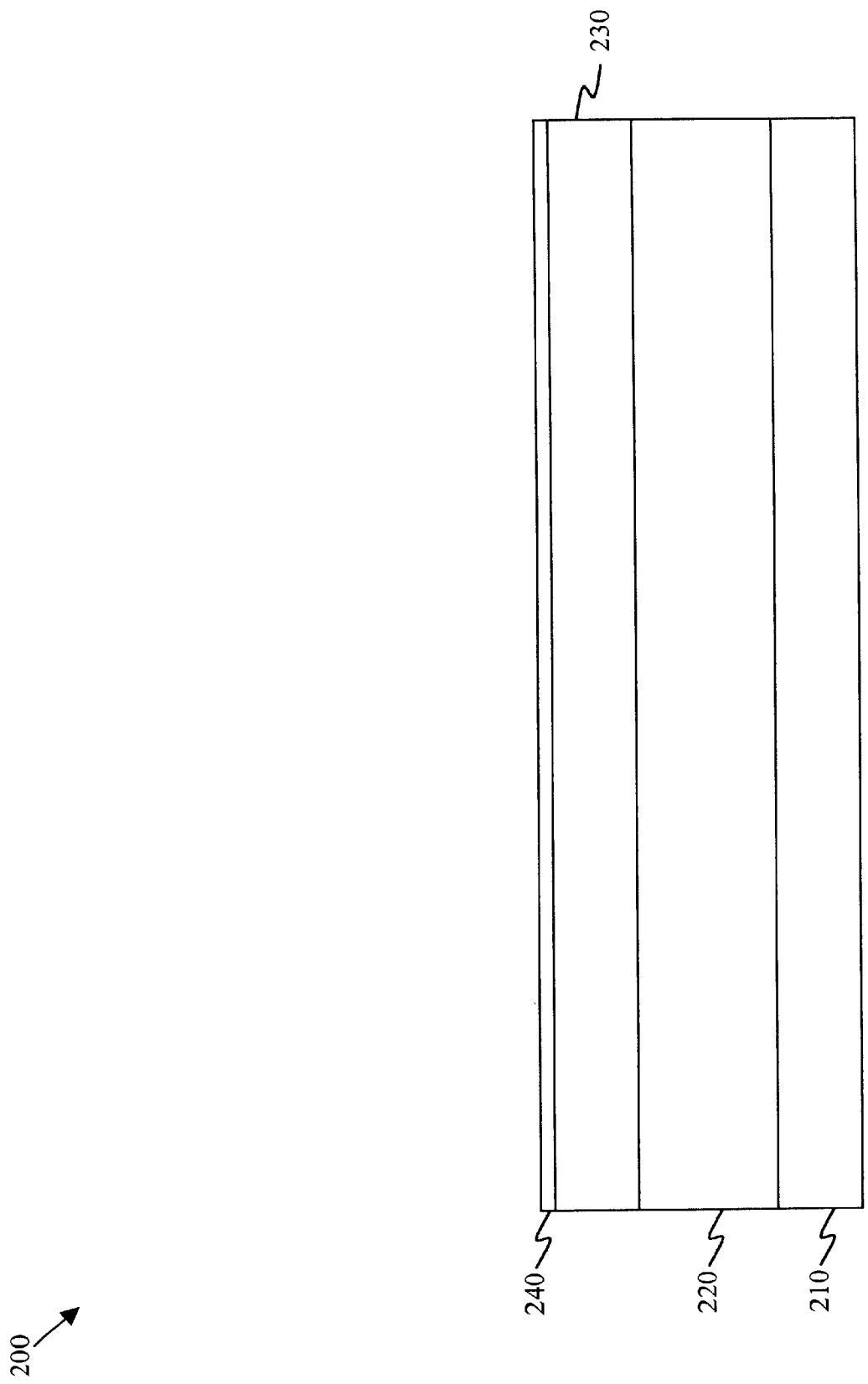
FIG. 2 illustrates the formation of a partially completed optoelectronic device including a substrate, a lower cladding layer, an active region, and a unique interface barrier layer.
Figure 3:
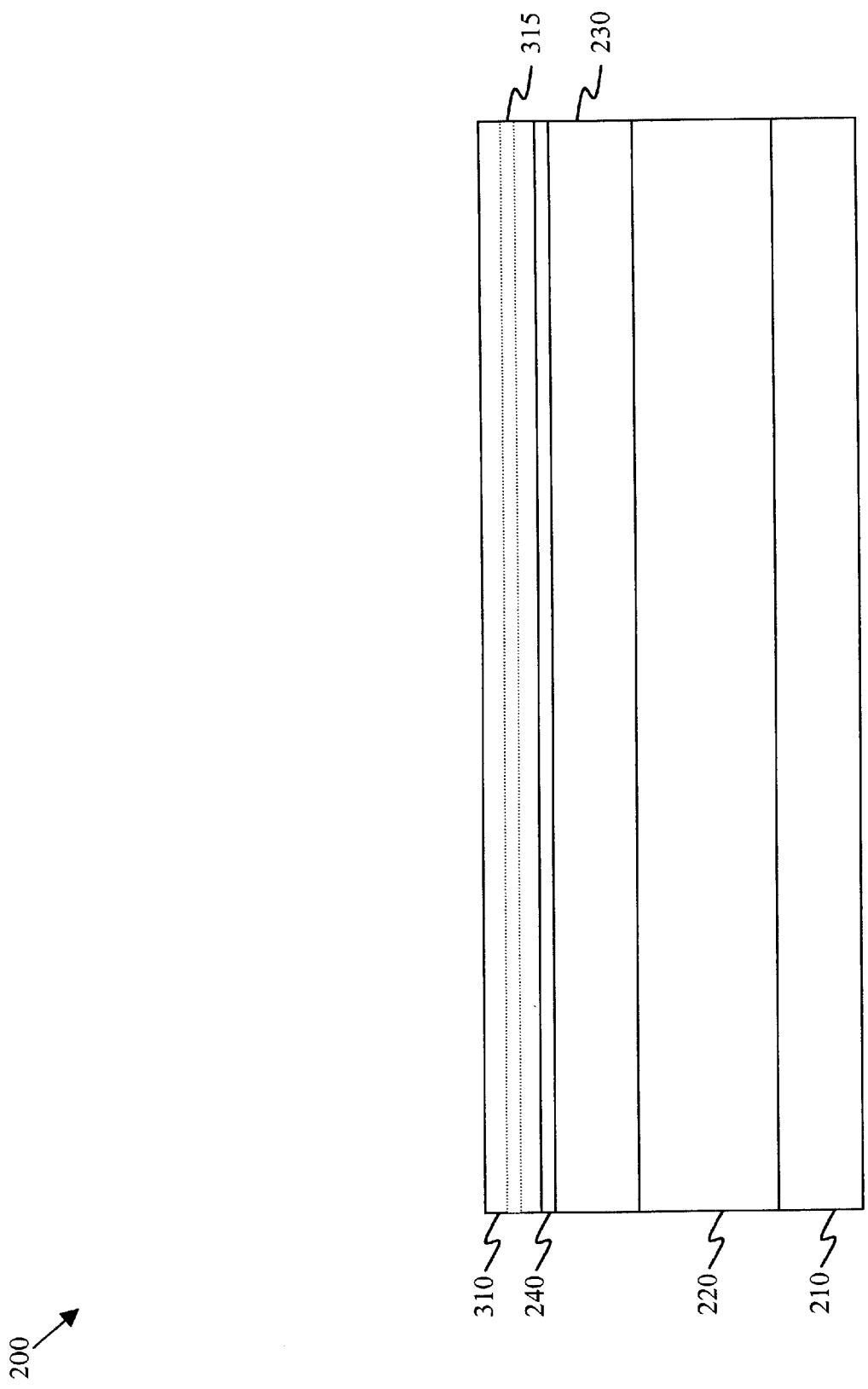
FIG. 3 illustrates the partially completed optoelectronic device illustrated in FIG. 2 after formation of a barrier layer.
Figure 4:
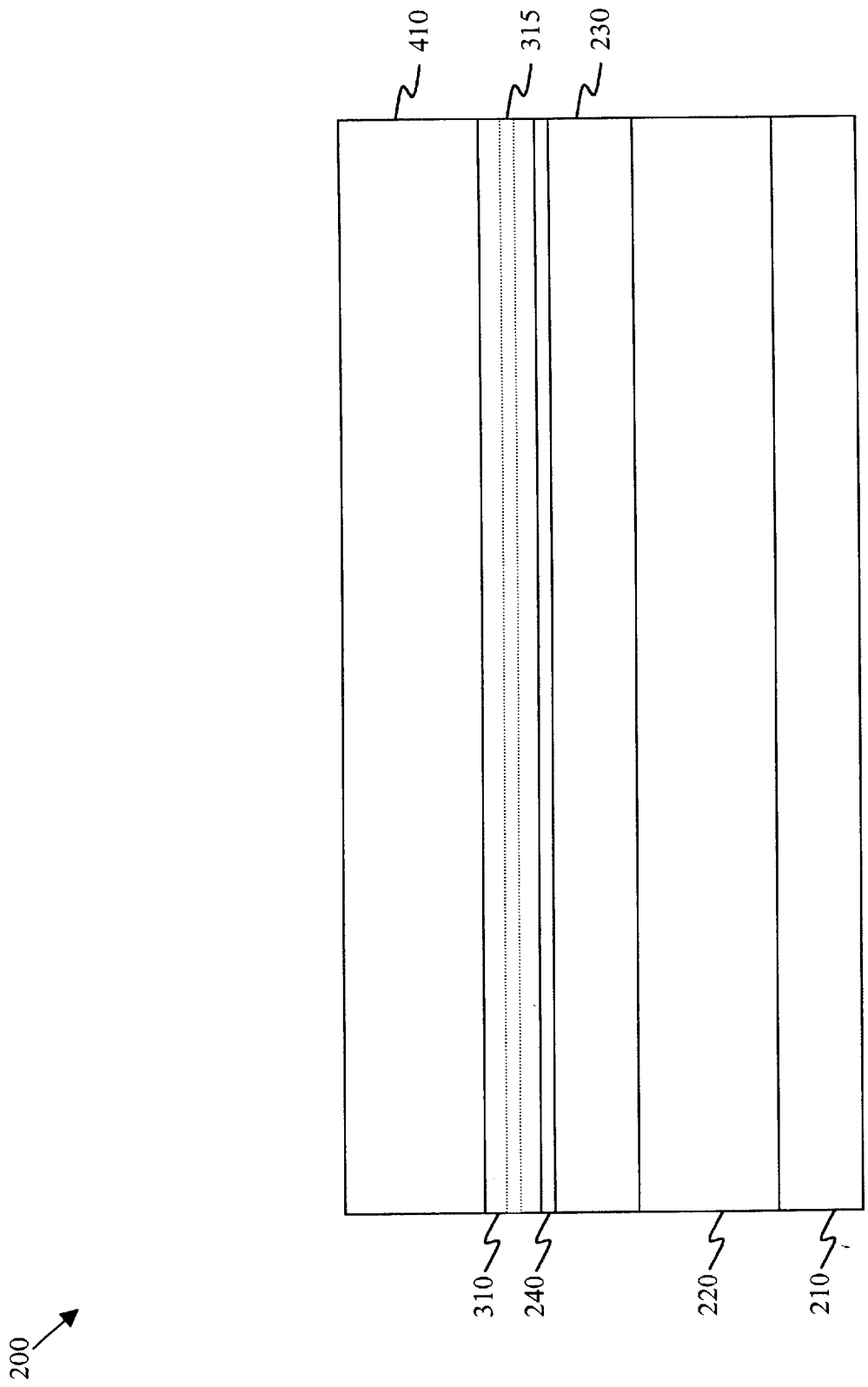
FIG. 4 illustrates the partially completed optoelectronic device illustrated in FIG. 3 after formation of an upper cladding layer.

Turning to FIGS. 2–4, with continued reference to FIG. 1, illustrated are various intermediate stages of the optoelectronic device 100 of FIG. 1. FIG. 2 illustrates a cross-sectional view of a partially completed optoelectronic device 200. The partially completed optoelectronic device illustrated in FIG. 2, includes a lower cladding layer 220, which in a previous step (not shown) was formed over a substrate 210. The substrate 210 may be any layer located in an optoelectronic device, including a layer located at the wafer level or a layer located above or below wafer level. The substrate 210, in an exemplary embodiment, is a highly n-doped indium phosphide (InP) substrate.

As previously mentioned, located over the substrate 210 may be the lower cladding layer 220. The lower cladding layer 220, in the illustrative embodiment, is an n-doped InP cladding layer. It should be understood that the lower cladding layer 220 is not limited to an n-doped InP layer, and that other materials, doped or undoped, may be used. An active region 230 is located over the substrate 210 and lower cladding layer 220. The active region 230, as previously mentioned during the discussion of FIG. 1, may be a quantum well region, and could in an exemplary embodiment include separate confining layers (not shown). In an exemplary embodiment of the invention, the active region 230 includes materials chosen from group III–V compounds. The active region 230 is typically intentionally not doped, however, in an alternative embodiment it may be doped as long as the p-n junction placement is taken into consideration. The substrate 210, lower cladding layer 220 and the active region 230 may all be formed by conventional processes.

Further illustrated in FIG. 2, an interface barrier layer 240 has been formed over the active region 230. In the illustrated embodiment, the interface barrier layer 240 is formed directly on the active region 230. The interface barrier layer 240, in an exemplary embodiment, may be an indium phosphide interface barrier layer. Likewise, in an alternative exemplary embodiment, the interface barrier layer 240 may have a thickness ranging from about 10 nm to about 100 nm, and more preferably, the thickness may be about 50 nm. The interface barrier layer 240 may be formed using conventional deposition processes, such as a metalorganic vapor-phase epitaxy (MOVPE) or similar epitaxial process. Processing conditions that could be used to form the interface barrier layer 240 include, but are not limited to, temperatures ranging from about 600° C. to about 650° C. and pressures ranging from about 40 torr to about 200 torr.

Turning to FIG. 3, illustrated is the partially completed optoelectronic device 200 illustrated in FIG. 2, after formation of a barrier layer 310. In the illustrative embodiment shown in FIG. 3, the barrier layer 310 is formed on the interface barrier layer 240. In an exemplary embodiment, the barrier layer 310 is an indium gallium arsenide phosphide (InGaAsP) or indium gallium arsenide (InGaAs) barrier layer having a thickness that ranges from about 10 nm to about 100 nm. Likewise, in another exemplary embodiment, the barrier layer 310 has a thickness of about 25 nm. In the embodiment shown in FIG. 3, the barrier layer 310 has a doped region 315 located therein. As illustrated, the doped region 315 may be located in the middle of the barrier layer 310. However, the location of the doped region 315 within the barrier layer 310 is not critical. For example, the dopant region 315 may be located in the barrier layer 310 near the active region 230, near an upper capping layer, or throughout the barrier layer 310.

The doped region 315, in one particular embodiment, includes an n-type dopant, such as silicon. The concentration of the dopant located within the doped region 315 should be sufficient to substantially deter the diffusion of another dopant, for example zinc, beryllium, magnesium or cadmium, therethrough. The required concentration of the dopant located within the dopant region 315 is partially dependent on the thickness of the barrier layer 310, and therefore, may vary significantly from one design to another. In any event, the dopant concentration should be low enough such that an additional p-n junction substantially is not formed outside the active region 230, such as in the prior art optoelectronic devices. For example, a dopant concentration ranging from about $5E17/cm^3$ to about $3E18/cm^3$ may be used. Illustratively, the dopant concentration may be about 2E18/cm³. It should be noted that the barrier layer 310 adds substantially no optical absorption to the device; therefore, the inclusion of the barrier layer 310 within the device does not have a negative effect.

The barrier layer 310, including the doped region 315, may be formed using a conventional epitaxial process. For example, in one exemplary embodiment, the barrier layer 310 and doped region 315, may be formed with a metalorganic vapor-phase epitaxy (MOVPE) process using a temperature ranging from about 600° C. to about 650° C. and a low pressure ranging from about 40 torr to about 200 torr. In situations where the barrier layer 310 comprises indium gallium arsenide phosphide, the indium may be provided at a flow rate ranging from about 100 sccm to about 150 sccm, the gallium may be provided at a flow rate of about 20 sccm, the arsenide may be provided at a flow rate ranging from about 10 sccm to about 50 sccm and the phosphide may be provided at a flow rate of about 200 sccm.

Turning to FIG. 4, illustrated is the partially completed optoelectronic device illustrated in FIG. 3, after formation of an upper cladding layer 410. The upper cladding layer 410, in an exemplary embodiment, is an indium phosphide cladding layer having a dopant formed therein. The dopant is typically a p-type dopant such as zinc; however, one having skill in the art understands that other dopants such as cadmium, beryllium and magnesium may be used in this capacity. It is the dopant located within the upper cladding layer 410 that is prevented from diffusing into the active region 230 by the interface barrier layer 240 and barrier layer 310. The upper cladding layer 410 may be formed using a conventional epitaxial process, for example a metalorganic vapor-phase epitaxy, or other similar process. After formation of the upper cladding layer 410, a capping layer 180 (FIG. 1) may be conventionally formed, resulting in the completed optoelectronic device 100 illustrated in FIG. 1.

Turning briefly to FIG. 5, illustrated is an optical fiber communication systems 500, which may form one environment where the completed optoelectronic device 100 may be included. The optical fiber communication system 500, in the illustrative embodiment, includes an initial signal 510 entering a receiver 520. The receiver 520, receives the initial signal 510, addresses the signal 510 in whatever fashion desired, and sends the resulting information across an optical fiber 530 to a transmitter 540. The transmitter 540 receives the information from the optical fiber 530, addresses the information in whatever fashion desired, and sends an ultimate signal 550. As illustrated in FIG. 5, the completed optoelectronic device 100 may be included within the receiver 520. However, the completed optoelectronic device 100 may be also be included anywhere in the optical fiber communication system 500, including the transmitter 540. The optical fiber communication system 500 is not limited to the devices previously mentioned. For example, the optical fiber communication system 500 may include a source 560, such as a laser or a diode. Turning briefly to FIG. 6, illustrated is an alternative optical fiber communication system 600, having a repeater 610, including a second receiver 620 and a second transmitter 630, located between the receiver 520 and the transmitter 540.

Although the present invention has been described in detail, those skilled in the art should understand that they can make various changes, substitutions and alterations herein without departing from the spirit and scope of the invention in its broadest form.

What is claimed is:
1. An optoelectronic device, including:
    an active region located over a substrate;
    an interface barrier layer located over the active region;
    a barrier layer located over the active region; and
    an upper cladding layer located over the interface barrier layer and the barrier layer.
2. The optoelectronic device recited in claim 1 wherein the interface barrier layer is an indium phosphide interface barrier layer and the barrier layer is an indium gallium arsenide phosphide or indium gallium arsenide barrier layer.
3. The optoelectronic device recited in claim 1 further including a lower cladding layer located between the active region and the substrate.
4. The optoelectronic device recited in claim 1 wherein at least a portion of the barrier layer is doped with silicon.
5. The optoelectronic device recited in claim 4 wherein the silicon doping has a concentration ranging from about 5E17/cm³ to about 3E18/cm³.
6. The optoelectronic device recited in claim 5 wherein the silicon has a concentration of about 2E18/cm³.
7. The optoelectronic device recited in claim 1 wherein the barrier layer has a thickness ranging from about 10 nm to about 100 nm.
8. The optoelectronic device recited in claim 7 wherein the barrier layer has a thickness of about 25 nm.
9. The optoelectronic device recited in claim 1 wherein the interface barrier layer has a thickness ranging from about 10 nm to about 100 nm.
10. The optoelectronic device recited in claim 9 wherein the interface barrier layer has a thickness of about 50 nm.
11. The optoelectronic device recited in claim 1 further including a contact layer located over the upper cladding layer.
12. A method of manufacturing an optoelectronic device, including:
    forming an active region over a substrate;
    forming an interface barrier layer over the active region;
    forming a barrier layer over the active region; and
    forming an upper cladding layer over the interface barrier layer and the barrier layer.
13. The method recited in claim 12 wherein forming the interface barrier layer includes forming an indium phosphide interface barrier layer, and forming the barrier layer includes forming an indium gallium arsenide phosphide or indium gallium arsenide barrier layer.
14. The method recited in claim 12 further including forming a lower cladding layer between the active region and the substrate.
15. The method recited in claim 12 wherein forming the barrier layer includes forming the barrier layer having at least a portion thereof doped with silicon.
16. The method recited in claim 15 wherein forming the barrier layer having at least a portion thereof doped with silicon includes forming the silicon doped barrier layer having a concentration of silicon ranging from about 5E17/cm³ to about 3E18/cm³.
17. The method recited in claim 16 wherein forming the silicon doped barrier layer having the concentration of silicon ranging from about 5E17/cm³ to about 3E18/cm³ includes forming the silicon doped barrier layer having a concentration of about 2E18/cm³.
18. The method recited in claim 12 wherein forming the barrier layer includes forming the barrier layer having a thickness ranging from about 10 nm to about 100 nm.
19. The method recited in claim 18 wherein forming the barrier layer having a thickness ranging from about 10 nm to about 100 nm includes forming the barrier layer having a thickness of about 25 nm.

20. The method recited in claim 12 wherein forming the interface barrier layer includes forming the interface barrier layer having a thickness ranging from about 10 nm to about 100 nm.

21. The method recited in claim 20 wherein forming the interface barrier layer having a thickness ranging from about 10 nm to about 100 nm includes forming the interface barrier layer having a thickness of about 50 nm.

22. The method recited in claim 12 further including forming a contact layer over the upper cladding layer.

23. The method recited in claim 12 wherein forming the active layer, forming the interface barrier layer, forming the barrier layer and forming the upper cladding layer includes forming the active layer, forming the interface barrier layer, forming the barrier layer and forming the upper cladding layer using metalorganic vapor-phase epitaxy.

24. An optical fiber communications system, comprising:
   an optical fiber;
   a transmitter and a receiver connected by the optical fiber; and
   an optoelectronic device including:
      an active region located over a substrate;
      an interface barrier layer located over the active region;
      a barrier layer located over the active region; and
      an upper cladding layer located over the interface barrier layer and the barrier layer.

25. The optical fiber communication system recited in claim 24 wherein the interface barrier layer is an indium phosphide interface barrier layer and the barrier layer is an indium gallium arsenide phosphide or indium gallium arsenide barrier layer.

26. The optical fiber communication system recited in claim 24 wherein at least a portion of the barrier layer is doped with silicon.

27. The optical fiber communication system recited in claim 26 wherein the silicon has a concentration ranging from about $5E17/cm^3$ to about $3E18/cm^3$.

28. The optical fiber communication system recited in claim 24 wherein the barrier layer has a thickness ranging from about 10 nm to about 50 nm.

29. The optical fiber communication system recited in claim 24 wherein the interface barrier layer has a thickness ranging from about 10 nm to about 100 nm.

30. The optical fiber communication system recited in claim 24 further including a contact layer located over the upper cladding layer.

31. The optical fiber communication system recited in claim 24 wherein the transmitter includes the optoelectronic device.

32. The optical fiber communication system recited in claim 24 wherein the receiver includes the optoelectronic device.

33. The optical fiber communication system recited in claim 24 further including a source.

34. The optical fiber communication system recited in claim 33 wherein the source is a laser or a diode.

35. The optical fiber communication system recited in claim 24 further including a repeater.

* * * * *